United States Patent
Wang et al.

[11] Patent Number: 5,847,479
[45] Date of Patent: Dec. 8, 1998

[54] SELF-PRESSURE-BALANCED HYDRODYNAMIC BEARING SPINDLE MOTOR

[75] Inventors: Jian M. Wang; Leoi Sun, both of Tigard; Charles J. Cheever, Beaverton; Frank A. Gray, Portland, all of Oreg.

[73] Assignee: SAE Magnetics (H.K.) Ltd., San Jose, Calif.

[21] Appl. No.: 839,724

[22] Filed: Apr. 15, 1997

[51] Int. Cl.⁶ .............................. H02K 5/16; F16C 32/06
[52] U.S. Cl. .............................. 310/90; 384/107; 384/112
[58] Field of Search .................................... 310/67 R, 90, 310/90.5; 384/100, 107, 112, 113, 123, 132, 133; 360/98.07, 99.04, 99.08; 277/399, 400

[56] References Cited

U.S. PATENT DOCUMENTS

| | | | |
|---|---|---|---|
| 3,746,407 | 7/1973 | Stiles et al. | 310/90.5 |
| 3,782,737 | 1/1974 | Ludwig et al. | 277/399 |
| 4,445,793 | 5/1984 | Shinohara | 384/130 |
| 4,726,693 | 2/1988 | Anderson et al. | 384/114 |
| 4,795,275 | 1/1989 | Titcomb et al. | 384/107 |
| 4,883,367 | 11/1989 | Maruyama | 384/114 |
| 5,067,528 | 11/1991 | Titcomb et al. | 141/4 |
| 5,112,142 | 5/1992 | Titcomb et al. | 384/107 |
| 5,246,294 | 9/1993 | Pan | 384/119 |
| 5,407,281 | 4/1995 | Chen | 384/107 |
| 5,433,529 | 7/1995 | Hensel | 384/112 |
| 5,516,212 | 5/1996 | Titcomb | 384/107 |
| 5,524,985 | 6/1996 | Deerfield | 384/107 |
| 5,524,986 | 6/1996 | Leuthold et al. | 384/119 |
| 5,548,437 | 8/1996 | Yoshimoto et al. | 384/107 |
| 5,634,724 | 6/1997 | Zang et al. | 384/107 |
| 5,667,309 | 9/1997 | Nose | 384/132 |

OTHER PUBLICATIONS

"Development of Non–Contacting, Non–Leaking Spiral Groove Liquid Face Seals", by Tom Lai, Presented as a Society of Tribologists and Lubrication Engineers paper, STLE/ASME Tribology Conference, New Orleans, Louisiana, Oct. 24–27, 1993, Lubrication Engineering, vol. 50, 8, pp. 625–627, 629.

Primary Examiner—Clayton LaBalle
Attorney, Agent, or Firm—Chernoff, Vilhauer, McClung & Stenzel, LLP

[57] ABSTRACT

A hydrodynamic spindle motor of the present invention may include a shaft having a thrust bearing plate, an insert surrounding the shaft above the thrust bearing plate, and a sleeve surrounding the shaft below the thrust bearing plate. In one embodiment the thrust bearing plate is substantially centrally positioned along the longitudinal axis of the shaft. Preferably either the shaft has annular skewed herringbone shaft grooves or, alternatively, the insert has annular skewed herringbone insert grooves and the sleeve has annular skewed herringbone sleeve grooves. A set of circulation channels above the thrust bearing plate and a set of circulation channels below the thrust bearing plate preferably cross a shaft bore to allow for flow of lubricating fluid. A face seal may be formed between the lower radial cap surface of an end cap and an upper radial insert surface of the insert. The face seal may be used to form a capillary seal when the motor is in a static state and a pumping seal when the motor is in a dynamic state. The face pattern, in one embodiment, has a first annular zone adjacent the shaft, a middle annular groove, and a second annular zone.

38 Claims, 6 Drawing Sheets

SELF-PRESSURE-BALANCED HYDRODYNAMIC BEARING SPINDLE MOTOR

BACKGROUND OF THE INVENTION

The following invention relates to hydrodynamic bearings in spindle motors, and particularly to self-pressure, balanced hydrodynamic bearings in a spindle motor.

Electric spindle motors of the type used in disk drives conventionally rely on ball bearings to support a rotary member, such as a rotating hub, on a stationary member, such as a shaft. Rolling element or ball bearings are wear parts and, in time, friction will cause the motor to fail. In addition, ball bearings create debris in the form of dust or fine particles that can find their way into "clean" chambers housing the rotary magnetic disks which are driven by the motor. The mechanical friction inherent in ball bearings also generates heat and noise, both of which are undesirable in a disk drive motor.

Hydrodynamic or fluid bearings are often used as a replacement for ball bearings in disc drives and other apparatus having rotating parts. In a motor using a fluid bearing, the rotating member is separated from the stationary member by a film of lubricating fluid. A fluid bearing offers several advantages over ball bearings such as low non-repeatable run-out, low audible noise, and high damping. Also, conventional ball bearings no longer could keep up with modern high speed motors. Accordingly, fluid bearings represent a considerable improvement over conventional ball bearings in spindle drive motors. Examples of fluid bearings include Titcomb, et al. U.S. Pat. Nos. 5,112,142, 4,795,275 and 5,067,528; Shinohara U.S. Pat. No. 4,445, 793; and Anderson, et al. U.S. Pat. No. 4,726,693.

Two problems plague fluid bearings: the shaft tends to wobble within the sleeve and lubricating fluid tends to leak from the motor. If these problems occur the result can be increased wear and eventual failure of the bearing system or contamination from lubricating fluid escaping the motor.

Several innovations have been used to reduce the wobbling of the shaft. For example, a thrust bearing plate incorporated in and annularly perpendicular to the shaft tends to reduce wobbling. It should be noted, however, that the primary purpose of a thrust bearing plate is to support the vertical load, and the reduction of wobbling is byproduct thereof. Examples of thrust bearing plates may be found in Hensen U.S. Pat. Nos. 5,433,529 and 5,427,456 which have been assigned to applicant's assignee and are incorporated herein by reference. However, because these exemplary thrust bearing plates are positioned off-center, they only partially reduce the wobbling. Herringbone grooves cut or coined in the shaft or the sleeve have also been used to reduce wobbling. Examples of herringbone grooves may be found in both the aforementioned Hensel references.

Several innovations have been used to reduce the lubricating fluid leakage. For example, a labyrinth seal system, as shown in Cheever, et al. U.S. Pat. No. 5,536,088 which has been assigned to applicant's assignee and is incorporated herein by reference, tends to reduce leakage.

Some innovations have been specifically directed to the leakage caused by changes volume of the lubricating fluid. Changes in volume may be caused by changes in temperature, among other ways. Leuthold et al. U.S. Pat. No. 5,524,986 presents the solution of incorporating a flexible membrane that yields to the increased pressure of the increasing volume of the fluid. U.S. Pat. No. 5,524,986 attempts to solve this problem by using materials or combinations of materials such that gaps between the bearing surfaces become smaller due to different thermal expansion of the relevant parts. Pan U.S. Pat. No. 5,246,294 uses a large reservoir with an air cover to store excess lubricating fluid.

Face seals have also been used to reduce leakage. Some examples of face seals are discussed in "Development of Non-Contacting, Non-Leaking Spiral Groove Liquid Face Seals" by Tom Lai in the August, 1994 *Journal of the Society of Tribologists and Lubrication Engineers*. The designs discussed therein have significant flaws such that the author concluded that "a truly non-contacting, non-leaking seal might not be required for real world applications."

Despite all the innovations in fluid bearing technology, new and better technology is still needed to prevent the general problem of fluid bearings leaking and wobbling.

SUMMARY OF THE INVENTION

The present invention includes several features that alone or in combination reduce or prevent leakage and wobbling.

More specifically, an embodiment of the spindle motor having hydrodynamic bearings of the present invention includes a shaft having a perpendicular radial thrust bearing plate, an insert surrounding the shaft above the thrust bearing plate to form an upper axial cavity therebetween, and a sleeve surrounding the shaft below the thrust bearing plate to form a lower axial cavity therebetween. In one embodiment the thrust bearing plate is substantially centrally positioned along the longitudinal axis of the shaft.

An embodiment of the present invention includes a shaft with annular skewed herringbone shaft grooves that are preferably skewed off-center toward the thrust bearing plate. Alternatively, the insert inner diameter has insert grooves and the sleeve inner diameter has sleeve grooves. The insert grooves and sleeve grooves are preferably in an annular skewed herringbone pattern that is preferably skewed off-center toward the thrust bearing plate. The upper and lower radial plate surfaces may also have an annular skewed herringbone pattern that is skewed off-center annularly away from the shaft. Alternatively, the lower radial insert surface and the radial sleeve support surface may have an annular skewed herringbone pattern that is skewed off-center annularly away from the shaft.

A first set of circulation channels located above the thrust bearing plate and a second set of circulation channels located below the thrust bearing plate may be defined in the shaft. Both sets of circulation channels preferably cross a shaft bore. The circulation channels and the shaft bore together allow lubricating fluid to flow in a first direction down from above the thrust bearing plate to below the thrust bearing plate and to flow in a second direction up from below the thrust bearing plate to above the thrust bearing plate. A compensation slot may also be formed in the insert inner diameter below the upper radial insert surface.

A face seal may be formed between the lower radial cap surface of an end cap and an upper radial insert surface of the insert. The face seal has a face pattern with raised and lowered surfaces on either the lower radial cap surface or the upper radial insert surface. The raised surfaces and the opposite surface define a capillary cavity therebetween. The face pattern, in one embodiment, has a first annular zone adjacent the shaft, a middle annular groove, and a second annular zone.

An annular z-slot may be formed below the lower radial cap surface and between the sleeve inner diameter and the insert outer diameter.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
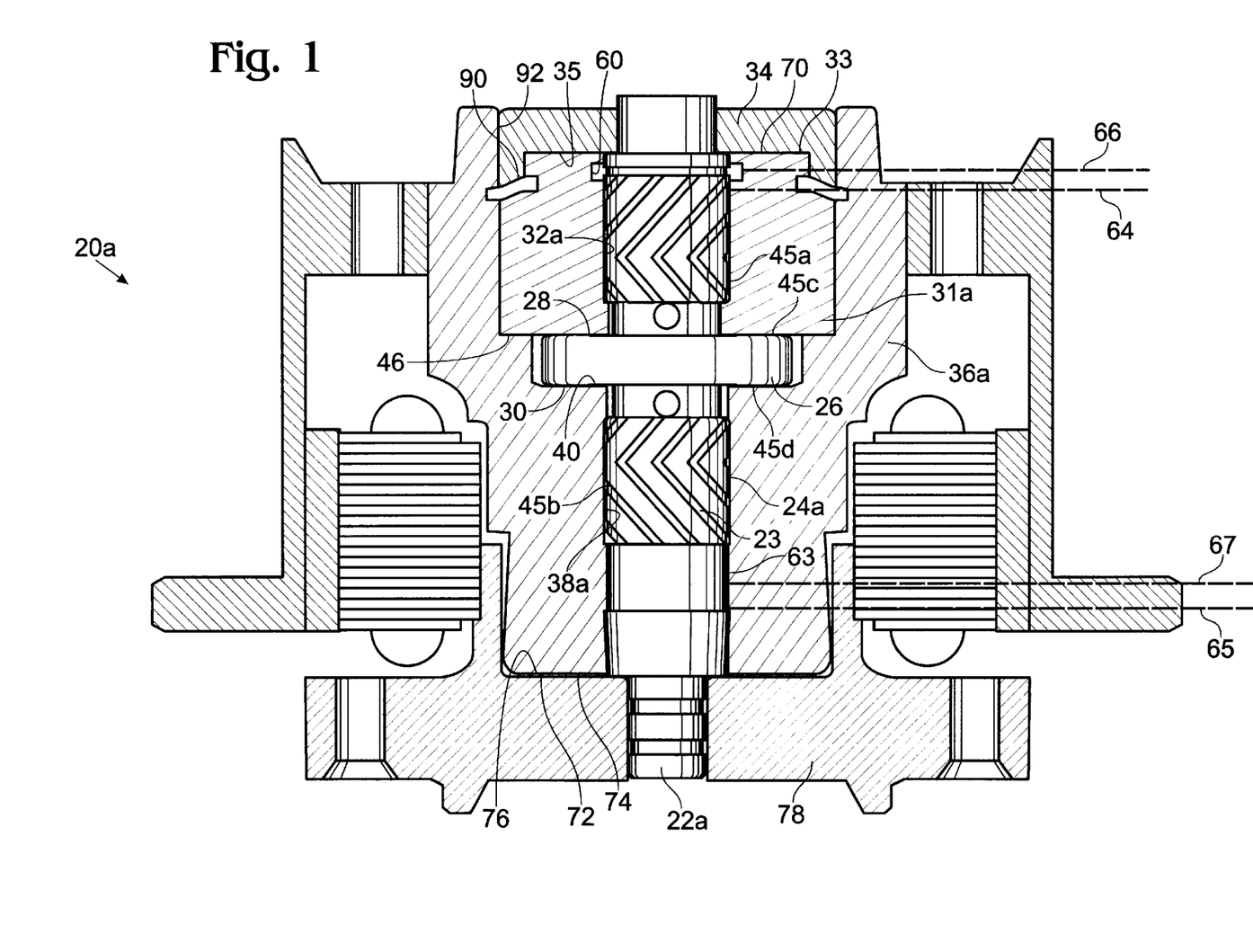
FIG. 1 is a side cutaway view of an electronic spindle motor with a shaft with skewed grooves incorporating several features of the present invention.
Figures 3A, 3B:
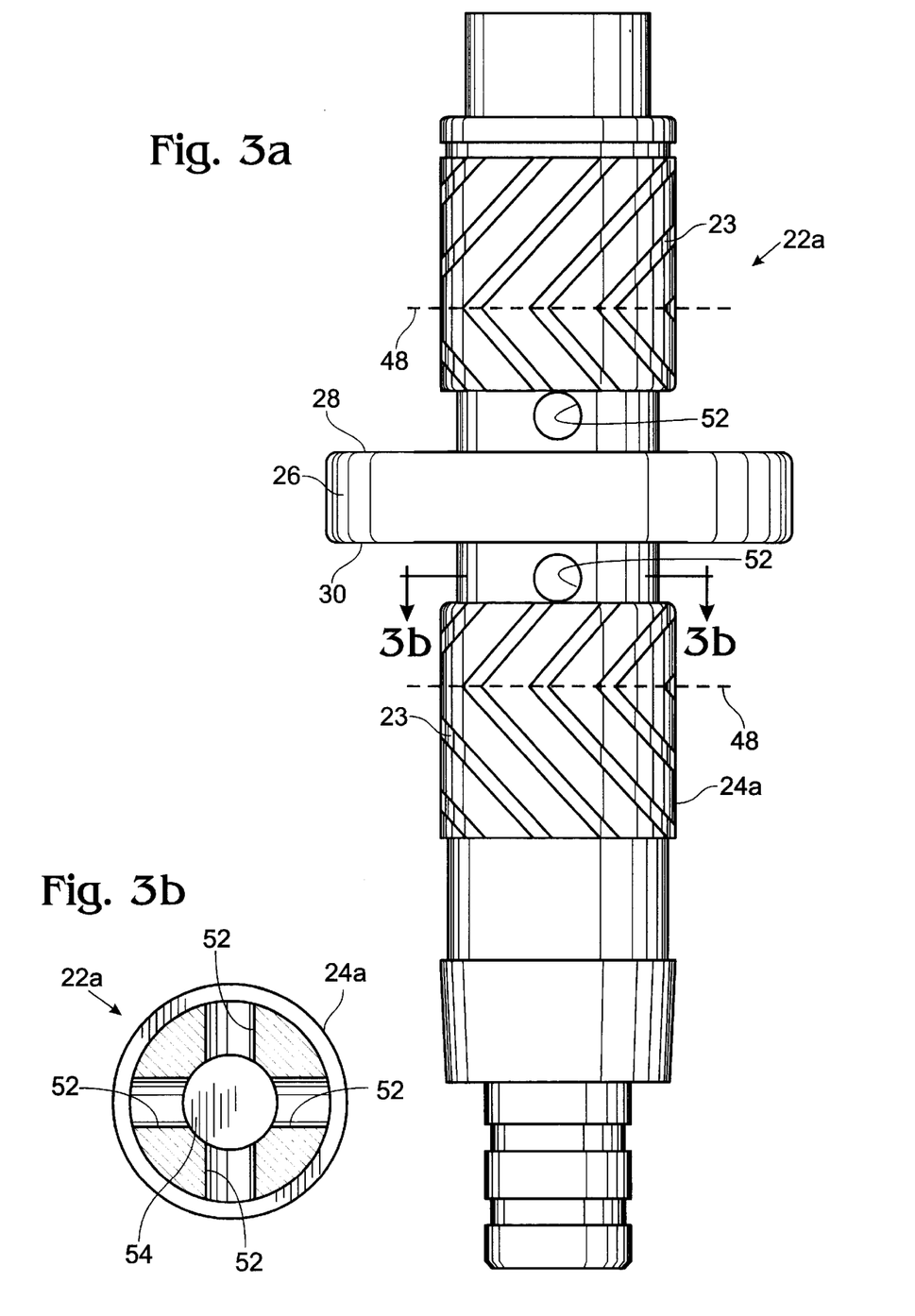
FIG. 3a is a perspective view of a shaft of the present invention with pressure balance circulation channels.
FIG. 3b is a cross section of the shaft of FIG. 3a taking along 3b—3b.

FIG. 1 shows a compact electronic spindle motor 20a. Motor 20a includes a central shaft 22a, 22b (FIG. 3a) with shaft grooves 23 in its outer diameter 24. Perpendicular to and integral with the grooved shaft 22a is a radial thrust bearing plate 26 that supports axial load and provides stability in the axial direction, that is, along the longitudinal axis of the grooved shaft 22a. The thrust bearing plate 26 has an upper radial plate surface 28 and a lower radial plate surface 30. The upper radial plate surface 28 at least partially supports a smooth insert 31a with a smooth inner diameter 32a. The insert 31a has an upper radial insert surface 33 that supports an end cap 34 with a lower radial cap surface 35. A smooth annular sleeve 36a has a smooth inner diameter 38a that partially encloses the shaft 22a. The sleeve 36a also has a radial sleeve support surface 40 substantially perpendicular to the sleeve's inner diameter 38a. The radial sleeve support surface 40 is at least partially coextensive with the lower radial plate surface 30.

Figure 2:
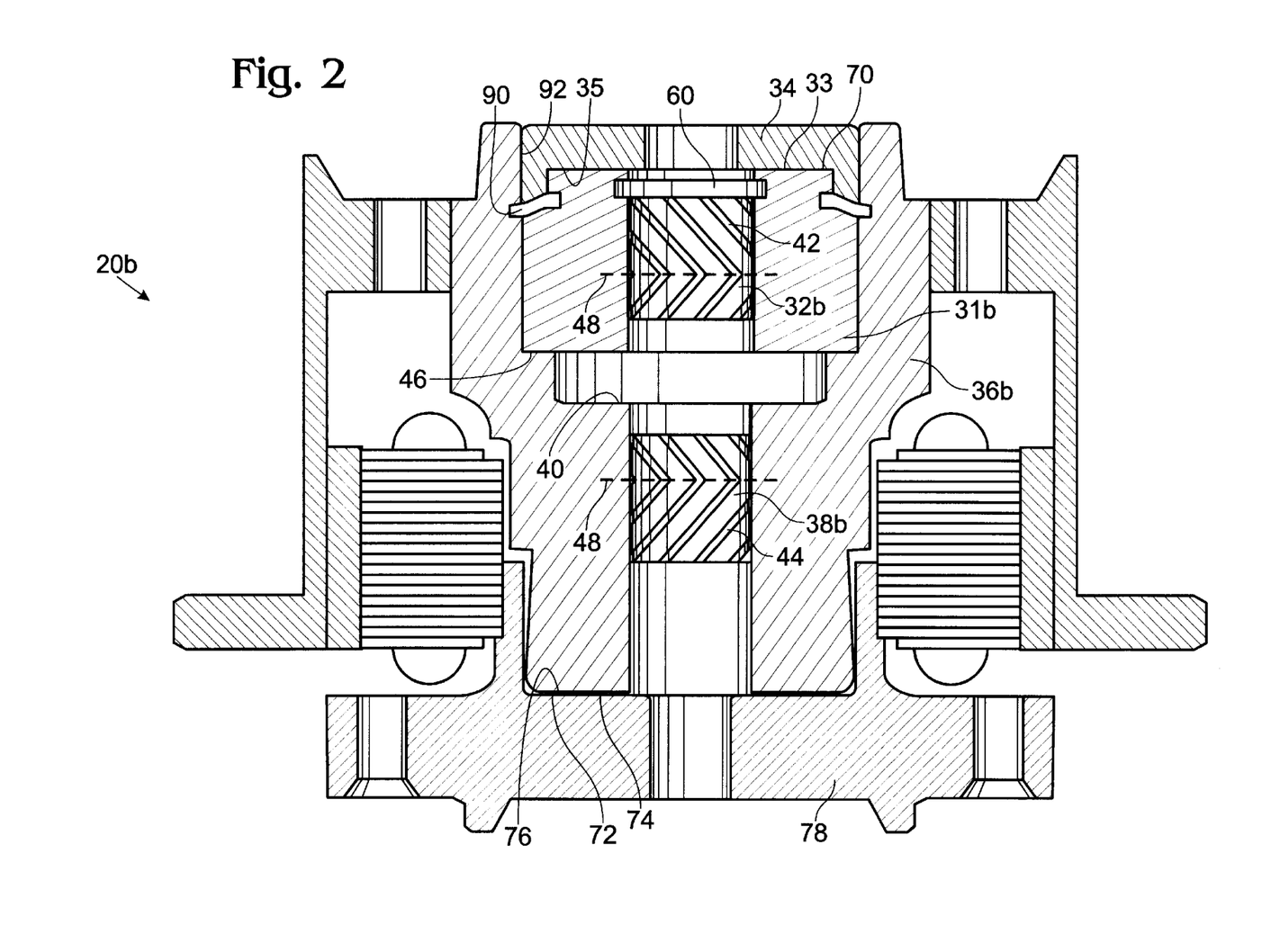
FIG. 2 is a side cutaway view of an alternate electronic spindle motor with a sleeve and an insert with skewed grooves incorporating several features of the present invention.
Figures 5, 7A, 7B:
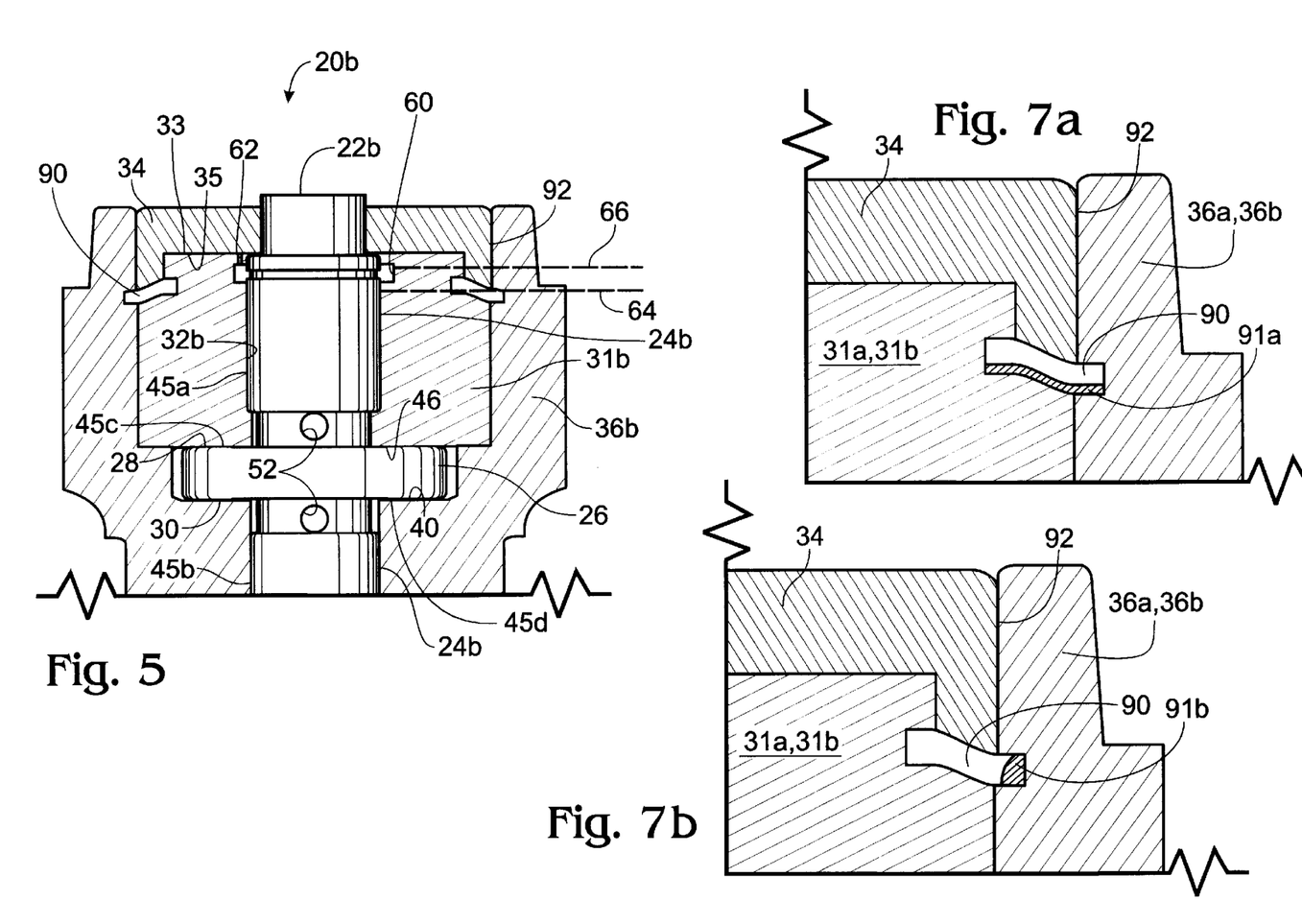
FIG. 5 is an enlarged view of an upper portion a motor with a smooth shaft.
FIGS. 7a–7b are enlarged views of the z-slot when the motor is in a static condition and during rotation, respectively.

FIGS. 2 and 5 show an alternate embodiment of a compact electronic spindle motor 20b including a grooved insert 31b and a grooved sleeve 36b surrounding a smooth central shaft 22b. FIG. 5 shows the top half of the smooth central shaft 22b with a smooth shaft outer diameter 24b. Structurally, the bottom half of the smooth shaft 22b would be identical to the grooved shaft 22a. As shown, perpendicular to and integral with the smooth shaft 22b would be a radial thrust bearing plate 26. Further, the thrust bearing plate 26 would have an upper radial plate surface 28 and a lower radial plate surface 30. The upper radial plate surface 28 at least partially supports the insert 31b with insert grooves 42 on its inner diameter 32b. The grooved insert 31b preferably has an upper radial insert surface 33 that supports an end cap 34 with a lower radial cap surface 35. An annular sleeve 36b has an inner diameter 38b with sleeve grooves 44 that partially encloses the shaft 22b. The sleeve 36b also has a radial surface 40 substantially perpendicular to the sleeve's inner diameter 38b. The radial sleeve support surface 40 of the sleeve 36b is at least partially coextensive with the lower radial plate surface 30.

The motor 20a, 20b, when assembled, includes bearing cavities 45a–45d into which lubricant is inserted to form hydrodynamic or fluid bearings. (Because the smooth shaft 22b is not shown in FIG. 2 the bearing cavities are shown in FIG. 5 and would be identical to those shown in FIG. 1) An axial insert bearing cavity 45a may be formed between the inner diameter 32a, 32b of the insert 31a, 31b and the outer diameter 24 of a shaft 22a, 22b. An axial sleeve bearing cavity 45b may be formed between the inner diameter 38a, 38b of the sleeve 36a, 36b and the outer diameter 24 of a shaft 22a, 22b. A radial upper bearing cavity 45c may be formed between a lower radial insert surface 46 of the insert 31a, 31b and the upper radial plate surface 28 where these surfaces are coextensive. A radial lower bearing cavity 45d may be formed between the radial sleeve support surface 40 of the sleeve 36a, 36b and the lower radial plate surface 30 where these surfaces are coextensive. Lubricating fluid within the bearing cavities functions as fluid thrust bearings therein and separates rotating components of the motor from stationary components of the motor. It should be noted that the bearing cavities may be tapered to encourage seals to form such as those disclosed in Charles J. Cheever, et al. U.S. patent application Ser. No. 08/485,373 which has been assigned to applicant's assignee and is incorporated herein by reference.

By including both the sleeve 36a, 36b and the insert 31a, 31b in the motor 20a, 20b, the thrust bearing plate 26 can be positioned substantially centrally on the longitudinal axis of the shaft 22a, 22b. This centralized position allows a first fluid thrust bearing to be formed in the radial upper bearing cavity 45c above the thrust bearing plate 26 and a second fluid thrust bearing to be formed in the radial upper bearing cavity 45c below the thrust bearing plate 26. This substantially symmetric configuration tends to prevent wobbling because it is less likely that the shaft will become misaligned when the load coincides with the center of gravity.

As shown in FIGS. 1 and 5 one surface of the bearing cavities 45a, 45b may include herringbone grooves 23, 42, 44 that are skewed so that the central point 48 of the grooves 23, 42, 44 are off-center towards the thrust bearing plate 26. By having the grooves 23, 42, 44 skewed towards the center of the shaft 22, net flow of the lubricating fluid tends to flow towards the center of the motor 20a, 20b and away from the exterior thereof. Graphically, the pressure would be shaped like a skewed bell curve with the greatest amount of pressure at the central point 48 and tapering off towards the end of the bearings. As will be discussed below, as the skewed grooves 23, 42, 44 generate net flow towards the center of the motor 20a, 20b, the column of lubricating fluid inside the bearing cavities 45a, 45b automatically shifts to middle in order to maintain flow balance. This shifting of the flow creates a pre-load mechanism that increases overall bearing stiffness.

Figure 4A:
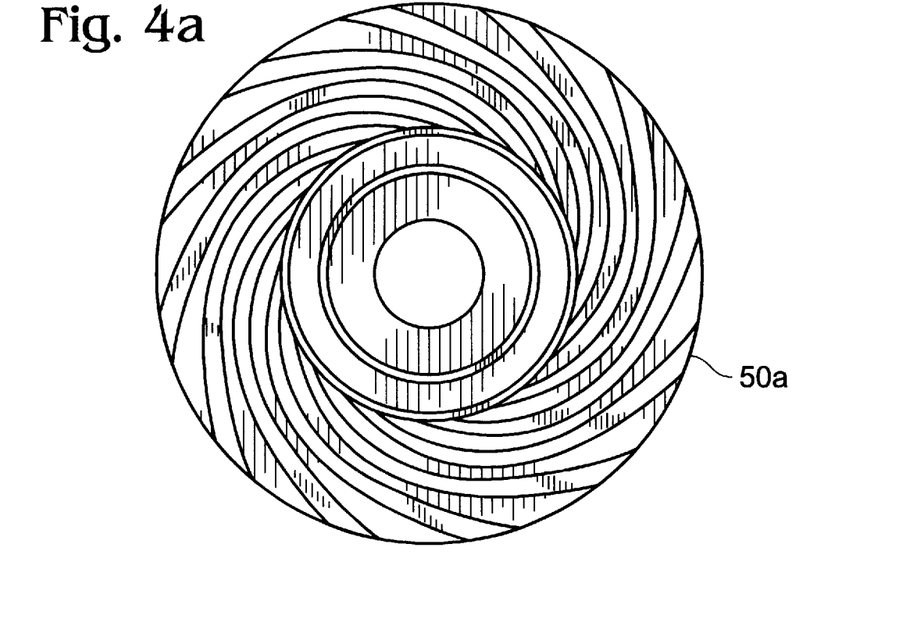
FIGS. 4a–4b are plan views of alternative thrust grooves of the present invention.
Figure 4B:
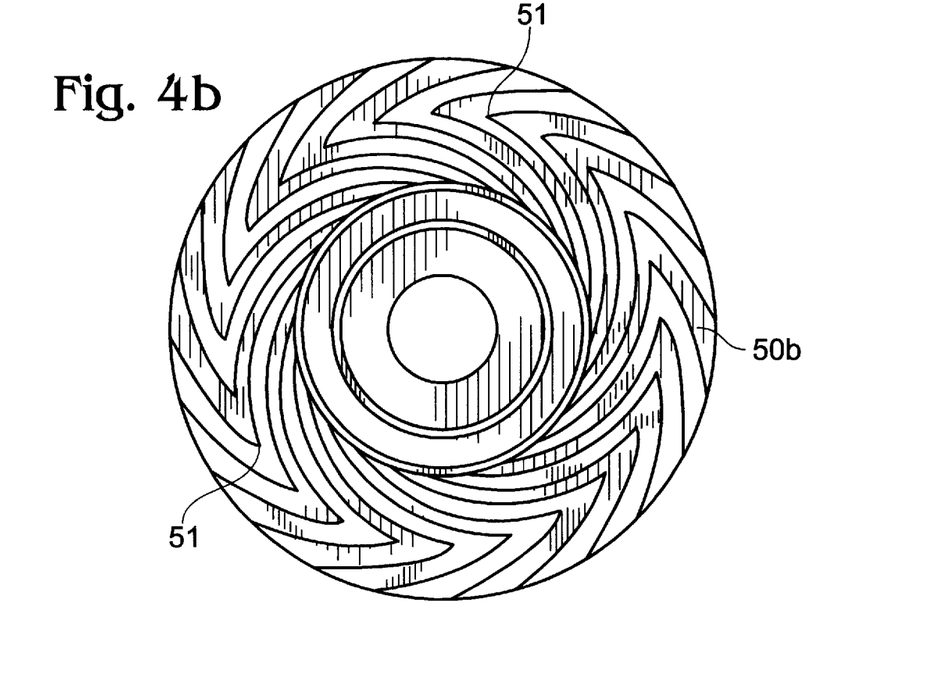

As shown in FIGS. 4a–4b, one surface of the bearing cavities 45c, 45d may include thrust grooves. FIG. 4a shows outward pumping thrust grooves 50a and FIG. 4b shows skewed annular herringbone thrust grooves 50b where the center point of the herringbone 51 is skewed outward away from the longitudinal axis of the shaft 22a, 22b. Both patterns 50a, 50b cause the pressure distribution created by the lubricating fluid to move outward and thus stabilize the shaft 22a, 22b. By moving the pressure distribution outward, there is a wider base of pressure to support the radial thrust bearing plate 26 and thus the shaft 22a, 22b tends to be more stable. Graphically, the pressure distribution of the skewed herringbone thrust grooves 50b would be shaped like a skewed bell curve with the greatest amount of pressure at the central point and tapering off towards the end of the bearings. It should be noted that it would be undesirable to have lubricating fluid pushed outward if the thrust bearing plate 26 was located at either end of the shaft, however, because the thrust bearing plate 26 is substantially centrally positioned, it is unlikely that the outward pressure will cause the lubricating fluid to escape the motor 20a, 20b.

FIGS. 1, 3a and 3b, and 5 show a shaft 22a, 22b with two sets of circulation channels 52. One set 52 is preferably located above the thrust bearing plate 26 and the other set 52 is preferably located below the thrust bearing plate 26. Each set 52 crosses a shaft bore 54 that extends at least partially through the axial center of the shaft 22a, 22b. The circulation channels 52 and the shaft bore 54 together allow lubricating fluid to flow down from above the thrust bearing plate 26 to below the thrust bearing plate 26. Also, the circulation channels 52 and the shaft bore 54 together allow lubricating fluid to flow up from below the thrust bearing plate 26 to above the thrust bearing plate 26. The direction of flow depends on the difference in the bearing pressure between the axial insert bearing cavity 45a and the axial sleeve bearing cavity 45b. Thus when pressure is created by the skewed grooves 23, 42, 44, the circulation channels 52 and shaft bore 54 allow the motor 20a, 20b to instantaneously self-pressure balance to reach its balance when the outside load condition is changed. The circulation channels 52 also store lubricating fluid.

FIGS. 1, 2, and 5 show a compensation slot 60 machined, cut, or otherwise formed in the insert 31a, 31b. One or more pin hole access channels 62 (FIG. 5) may optionally be formed in the insert 31a, 31b that allows access to the compensation slot 60 from the upper radial insert surface 33 once the shaft 22a, 22b and insert 31a, 31b are in place. Accordingly, once the motor 20a, 20b has been almost completely assembled and filled with lubricating fluid, a needle or other narrow device may be inserted into the access channel 62 and a small amount of lubricating fluid may be removed from the compensation slot 60. By removing lubricating fluid, the total amount of lubricating fluid is now less than the maximum amount that can be held in the cumulative volume of the bearing cavities 45a–45d, circulation channels 52, shaft bore 54, and compensation slot 60. This empty volume provides the necessary space to allow the lubricating fluid to migrate upward without immediately being forced beyond compensation slot 60. The empty volume also allows lubricating to be exchanged between the axial insert bearing cavity 45a and the axial sleeve bearing cavity 45b when pressure inside the cavities is unbalanced. Also, the empty volume allows the lubricating fluid to expand as it often does when exposed to environmental and temperature changes. Finally, the empty volume allows for room for air bubbles.

The centrally positioned thrust bearing plate 26, the two sets of circulation channels 52, and the compensation slot 60 allow migration of the lubricating fluid from an initial rest level (approximately defined at the top by line 64 and at the bottom by line 65) upward to a rotation level (approximately defined at the top by line 66 and at the bottom by line 67). When the motor 20a, 20b is in a static condition or at rest, the lubricating fluid tends to settle downward to the rest level 64, 65. However, when the motor begins rotating, pressure causes the lubrication fluid to migrate upward to the rotation level 66, 67. As mentioned above, during use, as the motor 20a, 20b self-balances itself, the lubricating fluid automatically adjusts between the rest level 64, 65 and the rotation level 66, 67.

An axial pressure relief groove 63 may be formed between the shaft 22a, 22b and the sleeve 36a, 36b to help reduce pressure on capillary seals of the motor 20a, 20b.

If the lubricating fluid does escape the compensation slot 60, it will enter the face seal 70 formed between the upper radial insert surface 33 of the insert 31a, 31b and the lower radial cap surface 35 of the end cap 34. A similar lower face seal 72 may be formed between the lower radial sleeve surface 74 of the sleeve 36a, 36b and a upper radial mounting surface 76 of a mounting structure 78. One surface of each face seal 70, 72 preferably includes a pattern 80a, 80b, 80c that is coined or otherwise formed therein. The opposite surface is preferably flat. Each pattern includes raised (first level) surfaces 82 and lowered (second level) surfaces 84. The raised surfaces 82 pressing against the flat surface causes a capillary action trapping lubricating fluid when the motor 20a, 20b is at rest. This capillary action forms a capillary seal. Preferably the volume of lubricating fluid that can be held by the capillary action is equal to or greater than the total volume of lubricating fluid in the motor 20a, 20b. When the motor 20a, 20b is rotating, the raised and lowered surfaces 82, 84 of the pattern 80a, 80b, 80c create pressure that pumps the lubricating fluid back into the gap 86 between the shaft 22a, 22b and the insert 31a, 31b.

Figure 6A:
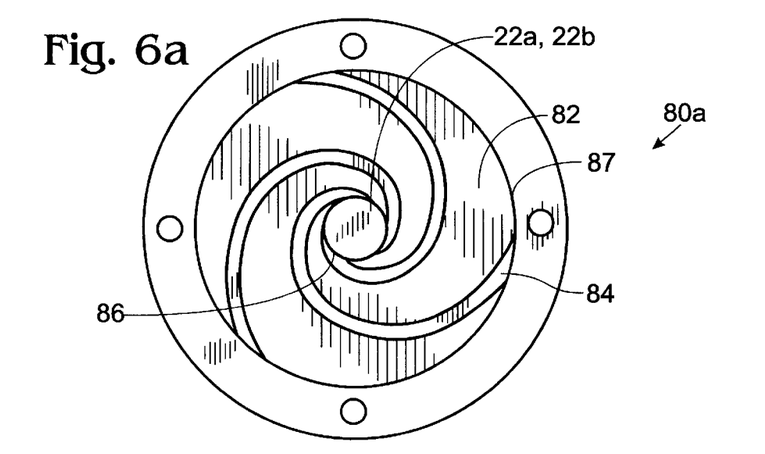
FIGS. 6a–6c are plan views of alternative face seals of the present invention.
Figure 6B:
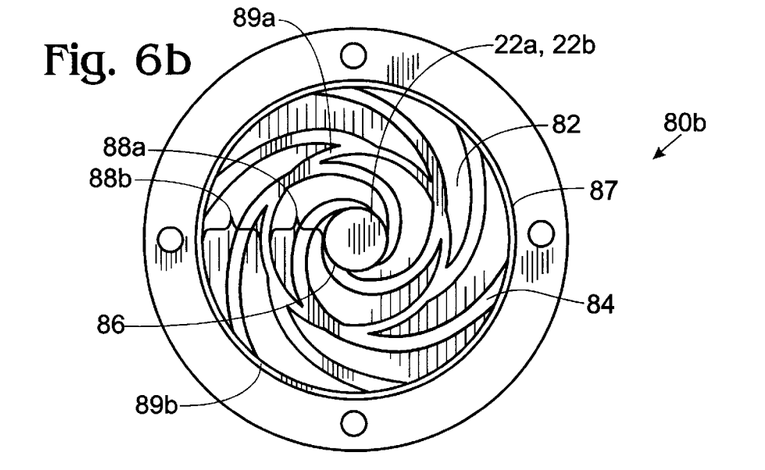
Figure 6C:
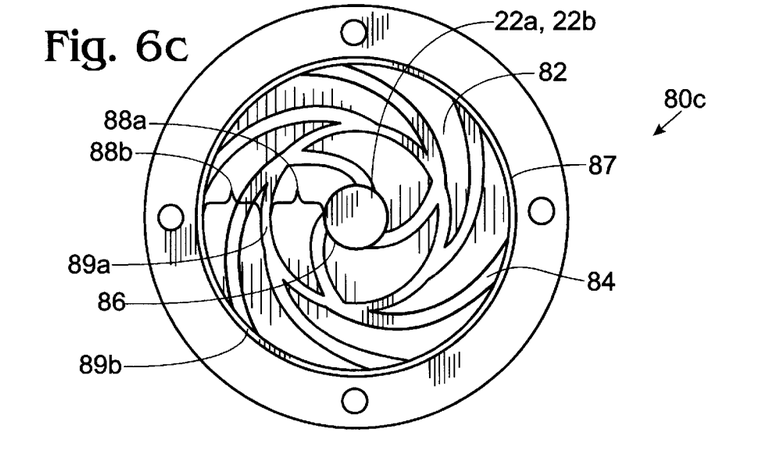

The face seal pattern 80a shown in FIG. 6a is a substantially single zone spiral pattern. A single zone pattern extends substantially from the shaft 20a, 20b and gap 86 substantially out to the outer perimeter 87. In a single zone pattern, when the motor 20a, 20b is in a static state, the lubricating fluid tends to migrate towards the outer perimeter 87. As the object of the seal is to prevent the lubricating fluid from escaping the seal, this is undesirable. On the other hand, FIGS. 6b and 6c show patterns 80b and 80c that are double zone spiral patterns. The first zone 88a adjacent the shaft is separated from the second zone 88b by a middle groove 89a. The second zone 88b is separated from the outer perimeter 87 by an outer groove 89b. In both of these patterns 80b, 80c, the middle groove 89a tends to prevent lubricating fluid from migrating beyond the first zone 88a. In the rare event that lubricating fluid migrates into the second zone 88b, the outer groove 89b prevents the lubricating fluid from escaping to the perimeter 87. Pattern 80c (FIG. 6c) has larger, more rectangular raised surfaces 82 that pattern 80b, and therefore tends to allow less migration than pattern 80b (FIG. 6b). It should be noted that all three patterns 80a, 80b, and 80c provide both a capillary seal when the motor 20a, 20b is in a static condition and a dynamic or pumping seal when the motor 20a, 20b is rotating.

In the rare case that lubricating fluid does escape past the face seal 70, it may be caught and stored in the z-slots 90. As shown in FIGS. 1, 2, and 5, the z-slots 90 may be formed between the sleeve 36a, 36b, the insert 31a, 31b, and the end cap 34. The zig-zag shape of the z-slots 90 is advantageous in that lubricating fluid flows downward. Because of the force of gravity, lubricating fluid in the z-slot 90 when the motor is at rest would be positioned as shown 91a in FIG. 7a. FIG. 7b shows lubricating fluid 91b in the z-slot 90 when the motor is rotating and the lubricating fluid is forced downward and outward into the slot by centrifugal force.

An additional capillary seal 92 between the end cap 34 and the sleeve 36a, 36b may be used as a final deterrent to lubricating fluid escaping the motor 20a, 20b.

It should be noted that any lubricating fluid such as oil may be used as a lubricating fluid. Preferably the lubrication fluid includes antifriction, antiwear, and antioxidant ingredients. In one embodiment, oil having the approximate viscosity of 30 Cs (centistrokes) at 20° C. is used, however, alternate fluids (including gasses and even air) may be used for this purpose.

It should be noted that the grooves 23, 42, 44 include raised portions called "ridges" with a ridge width and lowered portions called "grooves" with a groove width. The groove width may be different from the ridge width as shown. Alternatively, the groove and ridge widths may have a 1:1 ratio.

It should be noted that the invention may be adapted to work with spindle motors 20*a*, 20*b* having a rotating shaft or stationary shaft 22*a*, 22*b*.

Finally, it should be noted that features of the invention may be incorporated in alternate motors. For example, features such as a centrally located thrust bearing plate, skewed herringbone grooves, circulation channels, shaft bores, compensation slots, face seals, and z-slots may be used in alternative motors. Other features discussed in the above disclosure can be used alone or in combination to reduce or prevent leakage and wobbling in hydrodynamic bearings.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A spindle motor having hydrodynamic bearings, said motor comprising:
   (a) a shaft having a radial thrust bearing plate substantially perpendicular to said shaft, said thrust bearing plate having upper and lower radial plate surfaces, said shaft having a shaft outer diameter and a longitudinal axis;
   (b) an insert having an insert inner diameter and a lower radial insert surface substantially perpendicular to said insert inner diameter, said insert inner diameter surrounding said shaft outer diameter above said thrust bearing plate to form an upper axial cavity therebetween, said lower radial insert surface being at least partially coextensive with said upper radial plate surface;
   (c) a sleeve having a sleeve inner diameter and a radial sleeve support surface substantially perpendicular to said sleeve inner diameter, said sleeve inner diameter surrounding said shaft outer diameter below said thrust bearing plate to form a lower axial cavity therebetween, said radial sleeve support surface being at least partially coextensive with said lower radial plate surface;
   (d) said insert positioned within said sleeve; and
   (e) said thrust bearing plate being substantially centrally positioned along said longitudinal axis of said shaft.

2. The motor of claim 1, said shaft outer diameter having shaft grooves.

3. The motor of claim 1 wherein said shaft grooves have a herringbone pattern with a central point, said central point being skewed off-center.

4. The motor of claim 3 wherein said central point is skewed off-center toward said thrust bearing plate.

5. The motor of claim 1, said insert inner diameter having insert grooves and said sleeve inner diameter having sleeve grooves.

6. The motor of claim 1 wherein said insert grooves and sleeve grooves have a herringbone pattern with a central point, said central point being skewed off-center.

7. The motor of claim 6 wherein said central point is skewed off-center toward said thrust bearing plate.

8. The motor of claim 1, said upper and lower radial plate surfaces having an annular herringbone pattern with an annular central point, said annular central point being skewed off-center.

9. The motor of claim 8 wherein said annular central point is skewed off-center annularly away from said shaft.

10. The motor of claim 1, said lower radial insert surface and said radial sleeve support surface having an annular herringbone pattern with an annular central point, said annular central point being skewed off-center.

11. The motor of claim 10 wherein said annular central point is skewed off-center annularly away from said shaft.

12. The motor of claim 1, said shaft having a first set of circulation channels located above said thrust bearing plate and a second set of circulation channels located below said thrust bearing plate.

13. The motor of claim 12 wherein both said first set of circulation channels and said second set of circulation channels cross a shaft bore.

14. The motor of claim 1 further comprising:
   (a) a first set of circulation channels in said shaft positioned above said thrust bearing plate; and
   (b) a second set of circulation channels in said shaft positioned below said thrust bearing plate;
   (c) wherein said circulation channels and said shaft bore together allow lubricating fluid to flow in a first direction down from above said thrust bearing plate to below said thrust bearing plate and to flow in a second direction up from below said thrust bearing plate to above said thrust bearing plate.

15. The motor of claim 1 further comprising:
   (a) said insert having an upper radial insert surface; and
   (b) a compensation slot formed in said insert inner diameter below said upper radial insert surface.

16. The motor of claim 15 further comprising at least one access channel between said compensation slot and said upper radial insert surface.

17. The motor of claim 1 further comprising:
   (a) said insert having an upper radial insert surface;
   (b) an end cap having a lower radial cap surface at least partially coextensive with said upper radial insert surface; and
   (c) a face seal formed between said lower radial cap surface and said upper radial insert surface.

18. The motor of claim 17 wherein said lower radial cap surface has a face pattern, said face pattern having raised surfaces and lowered surfaces.

19. The motor of claim 18 wherein said raised surfaces are parallel to said upper radial insert surface, said raised surfaces and said upper radial insert surface defining a capillary cavity therebetween.

20. The motor of claim 17 wherein said lower radial cap surface has a face pattern, said face pattern having a first annular zone adjacent said shaft, a middle annular groove, and a second annular zone.

21. The motor of claim 17 wherein said upper radial insert surface has a face pattern, said face pattern having raised surfaces and lowered surfaces.

22. The motor of claim 21 wherein said raised surfaces are parallel to said lower radial cap surface, said raised surfaces and said lower radial cap surface defining a capillary cavity therebetween.

23. The motor of claim 17 wherein said upper radial insert surface has a face pattern, said face pattern having a first annular zone adjacent said shaft, a middle annular groove, and a second annular zone.

24. The motor of claim 1 further comprising:
(a) an annular end cap having a lower radial cap surface and a cap outer diameter;
(b) said insert having an insert outer diameter and an upper radial insert surface, said upper radial insert surface at least partially coextensive with said lower radial cap surface;
(c) said sleeve having an upper sleeve inner diameter surrounding said cap outer diameter and said insert outer diameter; and
(d) an annular z-slot formed below said lower radial cap surface and between said sleeve inner diameter and said insert outer diameter.

25. A spindle motor having hydrodynamic bearings surrounding a shaft, said motor comprising:
(a) a thrust bearing plate perpendicular to said shaft;
(b) a first set of circulation channels in said shaft, said first set of circulation channels positioned above said thrust bearing plate;
(c) a second set of circulation channels in said shaft, said second set of circulation channels positioned below said thrust bearing plate;
(d) a shaft bore in said shaft; and
(e) both said first set of circulation channels and said second set of circulation channels crossing said shaft bore;
(f) wherein said circulation channels and said shaft bore together allow flow of lubricating fluid.

26. The motor of claim 25 wherein said circulation channels and said shaft bore together allow lubricating fluid to flow in a first direction down from above said thrust bearing plate to below said thrust bearing plate and to flow in a second direction up from below said thrust bearing plate to above said thrust bearing plate.

27. The motor of claim 25 wherein said flow is determined by pressure surrounding said shaft.

28. A spindle motor having hydrodynamic bearings, said motor comprising:
(a) a shaft having a longitudinal axis;
(b) a radial thrust bearing plate perpendicular to said shaft and centrally positioned on said longitudinal axis of said shaft;
(c) an annular insert surrounding said shaft above said thrust bearing plate and an annular sleeve surrounding said shaft below said thrust bearing plate;
(d) an upper axial cavity formed between said shaft and said annular insert and a lower axial cavity formed between said shaft and said annular sleeve;
(e) a first set of circulation channels in said shaft positioned above said thrust bearing plate and a second set of circulation channels in said shaft positioned below said thrust bearing plate;
(f) a shaft bore in said shaft, both said first set of circulation channels and said second set of circulation channels crossing said shaft bore; and
(g) an annular compensation slot formed in said insert and surrounding said shaft;
(h) wherein said circulation channels, said shaft bore, and said compensation slot together allow lubricating fluid to flow between said upper axial cavity and said lower axial cavity.

29. A spindle motor having hydrodynamic bearings, said motor comprising:

(a) a shaft having a longitudinal axis;
(b) a first radial surface substantially perpendicular to said shaft;
(c) a second radial surface substantially perpendicular to said shaft;
(d) said first radial surface at least partially coextensive to said second radial surface; and
(e) a face seal formed between said first radial surface and said second radial surface, said face seal being a capillary seal when said motor is in a static state.

30. The motor of claim 29 wherein said first radial surface has a face pattern, said face pattern having raised surfaces and lowered surfaces.

31. The motor of claim 30 wherein said raised surfaces are parallel to said second radial surface, said raised surfaces and said second radial surface defining a capillary cavity therebetween.

32. The motor of claim 30 wherein said raised surfaces are in a swirl pattern.

33. The motor of claim 29 wherein said first radial surface has a face pattern, said face pattern having a first annular zone adjacent said shaft, a middle annular groove, and a second annular zone.

34. The motor of claim 33 wherein said first annular zone has raised surfaces that swirl from a first position adjacent to said shaft to a second position less than 140 degrees from said first position and adjacent said middle annular groove.

35. The motor of claim 29 wherein said face seal is a pumping seal when said motor is in a dynamic state.

36. A spindle motor having hydrodynamic bearings, said motor comprising:
(a) a shaft having a radial thrust bearing plate substantially perpendicular to said shaft, said thrust bearing plate having upper and lower radial plate surfaces, said shaft having a shaft outer diameter and a longitudinal axis;
(b) an insert having an insert inner diameter and a lower radial insert surface substantially perpendicular to said insert inner diameter, said insert inner diameter surrounding said shaft outer diameter above said thrust bearing plate to form an upper axial cavity therebetween, said lower radial insert surface being at least partially coextensive with said upper radial plate surface;
(c) a sleeve having a sleeve inner diameter and a radial sleeve support surface substantially perpendicular to said sleeve inner diameter, said sleeve inner diameter surrounding said shaft outer diameter below said thrust bearing plate to form a lower axial cavity therebetween, said radial sleeve support surface being at least partially coextensive with said lower radial plate surface;
(d) said thrust bearing plate being substantially centrally positioned along said longitudinal axis of said shaft;
(e) an annular end cap having a lower radial cap surface and a cap outer diameter;
(f) said insert having an insert outer diameter and an upper radial insert surface, said upper radial insert surface at least partially coextensive with said lower radial cap surface;
(g) said sleeve having an upper sleeve inner diameter surrounding said cap outer diameter and said insert outer diameter; and
(h) an annular z-slot formed below said lower radial cap surface and between said sleeve inner diameter and said insert outer diameter.

37. The motor of claim 25 wherein said first and second sets of circulation channels are crossing sets of circulation channels.

38. A method for constructing a spindle motor having hydrodynamic bearings and a shaft with a centrally located radial thrust bearing plate, said method comprising the steps of:

(a) positioning a sleeve within a motor, said sleeve having a sleeve inner diameter and a radial sleeve support surface substantially perpendicular to said sleeve inner diameter;

(b) inserting a shaft into said sleeve, said shaft having a radial thrust bearing plate substantially perpendicular to said shaft, said thrust bearing plate having upper and lower radial plate surfaces, said shaft having a shaft outer diameter and a longitudinal axis, said thrust bearing plate being substantially centrally positioned along said longitudinal axis of said shaft;

(c) forming a lower axial cavity between said sleeve inner diameter and said shaft outer diameter below said thrust bearing plate;

(d) positioning an annular insert within said sleeve and around said shaft, said insert having an insert inner diameter and a lower radial insert surface substantially perpendicular to said insert inner diameter, said lower radial insert surface being at least partially coextensive with said upper radial plate surface;

(e) forming an upper axial cavity between said insert inner diameter and said shaft outer diameter above said thrust bearing plate.

* * * * *